(12) United States Patent
Takeuchi et al.

(10) Patent No.: US 9,381,896 B2
(45) Date of Patent: Jul. 5, 2016

(54) DRIVING FORCE CONTROL DEVICE OF VEHICLE

(75) Inventors: Keisuke Takeuchi, Susono (JP); Kazuo Tsuruoka, Susono (JP); Toshio Tanahashi, Susono (JP); Yoshimitsu Agata, Numazu (JP); Hiroki Kaneko, Susono (JP); Yoji Kanehara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 14/378,255

(22) PCT Filed: Feb. 26, 2012

(86) PCT No.: PCT/JP2012/054667
§ 371 (c)(1),
(2), (4) Date: Aug. 12, 2014

(87) PCT Pub. No.: WO2013/125049
PCT Pub. Date: Aug. 29, 2013

(65) Prior Publication Data
US 2015/0039198 A1 Feb. 5, 2015

(51) Int. Cl.
*B60T 7/12* (2006.01)
*B60T 7/04* (2006.01)
(Continued)

(52) U.S. Cl.
CPC . *B60T 7/12* (2013.01); *B60T 7/042* (2013.01); *B60T 8/17555* (2013.01); *B60T 17/00* (2013.01);
(Continued)

(58) Field of Classification Search
CPC ............. B60W 2520/125; B60W 2540/12; B60W 2550/142; B60W 10/08; B60L 7/18; B60L 7/24; B60L 7/26; B60T 13/586
See application file for complete search history.

(56) References Cited

U.S. PATENT DOCUMENTS

| 6,033,041 A * | 3/2000 | Koga ..................... B60L 7/12 188/159 |
| 8,775,040 B2 | 7/2014 | Noumura et al. |

(Continued)

FOREIGN PATENT DOCUMENTS

| EP | 1 531 073 A1 | 5/2005 |
| JP | 2004-104991 A | 4/2004 |

(Continued)

OTHER PUBLICATIONS

May 22, 2012 International Search Report issued in International Patent Application No. PCT/JP2012/054667.

*Primary Examiner* — Khoi Tran
*Assistant Examiner* — Ryan Rink
(74) *Attorney, Agent, or Firm* — Oliff PLC (57) ABSTRACT

A driving force control device of a vehicle is provided which is configured to calculate a required braking force on the basis of an amount of pressure applied to a brake operating mechanism, which is operated for deceleration by a driver, and to control a braking force of a power plant, which includes a drive source generating an accelerating force and a braking force, and a braking force of a braking mechanism, which generates a braking force with the operation of the braking operating mechanism, in cooperation so that the total braking force of the vehicle as a whole becomes the required braking force. The driving force control device is configured to detect acceleration information including a lateral acceleration of the vehicle and to control the braking force of the power plant on the basis of the detected acceleration information when the brake operating mechanism is operated.

6 Claims, 5 Drawing Sheets

(51) Int. Cl.
  *B60T 8/1755* (2006.01)
  *B60T 17/00* (2006.01)
(52) U.S. Cl.
  CPC .......... *B60T 2201/16* (2013.01); *B60T 2220/02* (2013.01); *B60T 2270/303* (2013.01); *B60T 2270/604* (2013.01)

(56) References Cited

U.S. PATENT DOCUMENTS

| | | |
|---|---|---|
| 2004/0046448 A1 | 3/2004 | Brown |
| 2004/0117099 A1 | 6/2004 | Inagaki et al. |
| 2004/0238244 A1 | 12/2004 | Amanuma et al. |
| 2007/0252432 A1 | 11/2007 | Takamatsu |
| 2009/0216415 A1 | 8/2009 | Iwatsuki et al. |
| 2012/0136506 A1 | 5/2012 | Takeuchi et al. |
| 2013/0211644 A1* | 8/2013 | Yokoyama ............. B60T 8/267 701/22 |
| 2014/0324264 A1* | 10/2014 | Hashimoto ............ B60K 6/445 701/22 |
| 2015/0251654 A1* | 9/2015 | Wright ................ B60W 20/108 701/22 |

FOREIGN PATENT DOCUMENTS

| | | |
|---|---|---|
| JP | 2004-196046 A | 7/2004 |
| JP | A-2006-097862 | 4/2006 |
| JP | A-2007-296959 | 11/2007 |
| JP | A-2007-297958 | 11/2007 |
| JP | 2008-301590 A | 12/2008 |
| JP | 2011-207466 A | 10/2011 |
| WO | WO 2011/021634 A1 | 2/2011 |

* cited by examiner

DRIVING FORCE CONTROL DEVICE OF VEHICLE

TECHNICAL FIELD

The present invention relates to a device that controls a positive or negative driving force of a vehicle, and more particularly, to a device that controls a driving force at the time of turning.

BACKGROUND ART

A principal device for changing a speed or a driving force of a vehicle is a drive source such as an engine which is an internal combustion engine and a motor, which are controlled by an accelerating or decelerating operation mechanism such as an accelerator pedal. The driving force can be changed with a manual or automatic transmission and a vehicle speed can be changed accordingly. A brake device cannot increase a driving force but can decrease the driving force to decrease the vehicle speed. On the other hand, the driving force acts so as to cause the vehicle to run and to increase or decrease the vehicle speed and also has a large influence on the turning performance. For example, when the driving force is increased, steering characteristics are changed to tend so as to oversteer or to tend to understeer depending on the structure of the vehicle. Accordingly, in order to stabilize vehicle behavior or to improve running stability, it is preferable that devices capable of changing the vehicle speed or the driving force be controlled in cooperation without being independently controlled.

Therefore, for example, Japanese Patent Application Publication No. 2007-296959 (JP 2007-296959 A) describes a device configured to control a braking force of a brake device and a braking force of a power plant in cooperation. Specifically, in the device described in JP 2007-296959, a target deceleration is calculated on the basis of an amount of pressure or a pressing force against a brake pedal and a brake device is controlled on the basis of the target deceleration. Since a braking force is generated by controlling the brake device and thus the vehicle speed decreases, the transmission gear ratio is controlled so that the deceleration determined on the basis of the vehicle speed reaches the target deceleration. That is, the transmission gear ratio increases.

Japanese Patent Application Publication No. 2006-97862 (JP 2006-97862 A) describes a device configured to generate a deceleration by controlling a transmission and a brake device in cooperation. Particularly, the device described in JP 200697862 A is configured to increase the ratio of the deceleration generated by the transmission when the driving inclination is so-called sport-driving inclination. An example of a device for determining a degree of sport-driving inclination or the driving inclination of a driver is described in PCT International Publication No. 2011/021634. The device described in PCT International Publication No. 2011/021634 is configured to determine driving inclination on the basis of an acceleration (combined acceleration) obtained by combining a longitudinal acceleration and a lateral acceleration of a vehicle. A device that controls a driving force on the basis of determined driving inclination is described in Japanese Patent Application Publication No. 2007-297958 (JP 2007-297958 A). In the device described in JP 2007-297958 A, when it is determined that the sport-driving inclination is strong, the driving force in an accelerator-OFF state at the time of entering a corner is controlled to generate a higher deceleration in comparison with a case where the sport-driving inclination is weak.

However, the device described in JP 2007-296959 A can achieve a target deceleration using the braking force of the brake device and a so-called engine braking force based on the transmission gear ratio, but the target deceleration is calculated on the basis of a amount of pressure applied to the brake device such as an amount of pressure or a pressing force. Accordingly, when the amount of pressure applied to the brake device performed by a driver is insufficient at the time of a vehicle's entering a corner and the brake device is changed to a brake-OFF state during running in the corner, the deceleration becomes insufficient. For example, the amount of pressure applied to the brake device may be insufficient depending on the structure of the corner, due to the driver's misunderstanding of the vehicle speed, or the like, or the operation on the brake may be released to change the brake device to the brake-OFF state when the vehicle speed is satisfactorily or excessively decreases during running in the corner depending on the road structure or due to an excessive or deficient amount of pressure applied to the brake by the driver. In this case, since the target deceleration is calculated on the basis of the deficient amount of pressure applied to the brake, the engine braking force generated depending on the transmission gear ratio after the brake is changed to the brake-OFF state is based on the deficient target deceleration and thus the deceleration becomes deficient. As a result, the vehicle may depart from a target turning line in the corner and it is then necessary to operate the steering wheel or the accelerator so as to correct the departure. Accordingly, there is a possibility that the vehicle will become difficult to drive or the drivability will degrade.

On the other hand, as described in PCT International Publication No. 2011/021634, when the driving inclination is determined and the determination result is reflected in control of the driving force or the steering characteristics of the vehicle, it is possible to perform a control in consideration of the driver's intention and to achieve vehicle behavior intended by the driver. Such driving inclination can be employed for controlling the driving force at the time of running in a corner as described in JP 2006-97862 A or JP 2007-297958 A, but specific techniques for this case or techniques applicable to practical use have not been satisfactorily developed.

SUMMARY OF THE INVENTION

The present invention is made in consideration of the above-mentioned problems and an object thereof is to provide a driving force control device that can cause a vehicle to easily run along an intended path.

In order to achieve the above-mentioned object, according to the present invention, there is provided a driving force control device of a vehicle that is configured to calculate a required braking force on the basis of a amount of pressure applied to a brake operating mechanism, which is operated for deceleration by a driver, and to control a braking force of a power plant, which includes a drive source generating an accelerating force and a braking force, and a braking force of a braking mechanism, which generates a braking force with the operation of the braking operating mechanism, in cooperation so that the total braking force of the vehicle as a whole becomes the required braking force, wherein the driving force control device is configured to detect acceleration information including a lateral acceleration of the vehicle and to control the braking force of the power plant on the basis of the detected acceleration information when the brake operating mechanism is operated.

In the invention, the power plant may include an electric motor, and the driving force control device may be configured to generate the braking force of the power plant by controlling a regenerative torque of the electric motor on the basis of the acceleration information.

In the invention, the driving inclination of the driver may be determined on the basis of the acceleration information.

In the invention, a rotation speed of the drive source may be increased to a rotation speed at which acceleration responsiveness is excellent in a decelerating state after the driver's operation on the brake operating mechanism is released in preparation of acceleration after the deceleration ends.

The rotation speed at which the acceleration responsiveness is excellent may be a rotation speed of the drive source when the drive source generates the braking force in the decelerating state after the driver's operation on the brake operating mechanism is released or a rotation speed obtained by correcting the rotation speed.

The acceleration information may include an acceleration that can be generated by the required braking force.

When the driving inclination is determined, a rate of increase of the braking force of the power plant may gradually decrease as the determined driving inclination has a stronger request for prompt behavior of the vehicle.

Accordingly, in the driving force control device according to the invention, when the brake operating mechanism is operated to obtain a braking force, the braking force of the power plant including the drive source such as an engine is controlled on the basis of the acceleration information including the lateral acceleration. Accordingly, for example, when the driver operates the brake at the time of the vehicle entering a corner, the braking force of the power plant is the braking force based on the acceleration information. That is, the braking force of the power plant is controlled without depending on the amount of pressure applied to the brake operating mechanism. Accordingly, when the amount of pressure applied to the brake is zero (the brake is changed to the OFF state) but the acceleration including the lateral acceleration is generated, the braking force of the power plant controlled during the brake operation continuously acts on the vehicle even after the brake is changed to the OFF state. Since the braking force is based on the acceleration information including the lateral acceleration, the braking force at the time of turning in which the lateral acceleration is generated can be made to be suitable for the turning state and it is thus possible to provide a vehicle of which the intended turning can be easily achieved and which can be easily driven or which has excellent drivability.

When an electric motor having a regeneration function is provided, control responsiveness of a regenerative torque by the electric motor is excellent. Accordingly, for example, the braking force can be rapidly changed in response to the variation in the lateral acceleration and it is thus possible to provide a vehicle having excellent turning performance.

Since the acceleration information including the lateral acceleration varies even by a driving operation of a driver, the driving inclination can be determined on the basis of the acceleration information. In the invention, the driving inclination determined in this way can be reflected in other controls such as a steering control in the vehicle as well as the driving force control and thus the vehicle can run in more consideration of the intention of the driver.

In the invention, by increasing a rotation speed of the drive source to a rotation speed for preparation of subsequent acceleration in a decelerating state after the operation of the brake is released, it is possible to improve acceleration responsiveness to acceleration, for example, at the time of departing from the corner in the decelerating state.

When the acceleration information includes the acceleration (deceleration) based on the required braking force, the acceleration values used to compute the target deceleration and the decelerating driving force are common and it is thus possible to improve controllability.

By setting the relationship between the driving inclination and the braking force of the power plant to the above-mentioned nonlinear characteristics, it is possible to provide a vehicle that can be easily driven.

MODES FOR CARRYING OUT THE INVENTION

Figure 5:
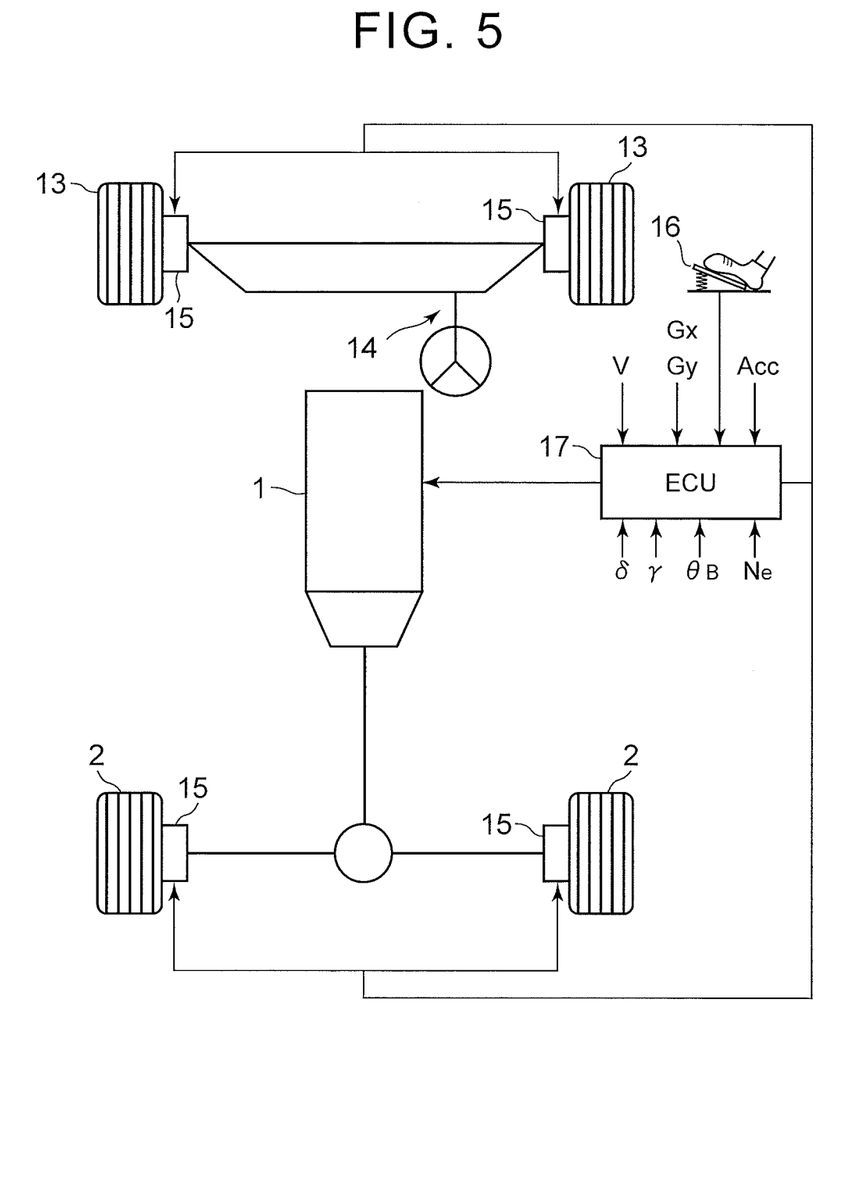
FIG. 5 is a diagram schematically illustrating a vehicle to which the present invention can be applied.
Figure 6:
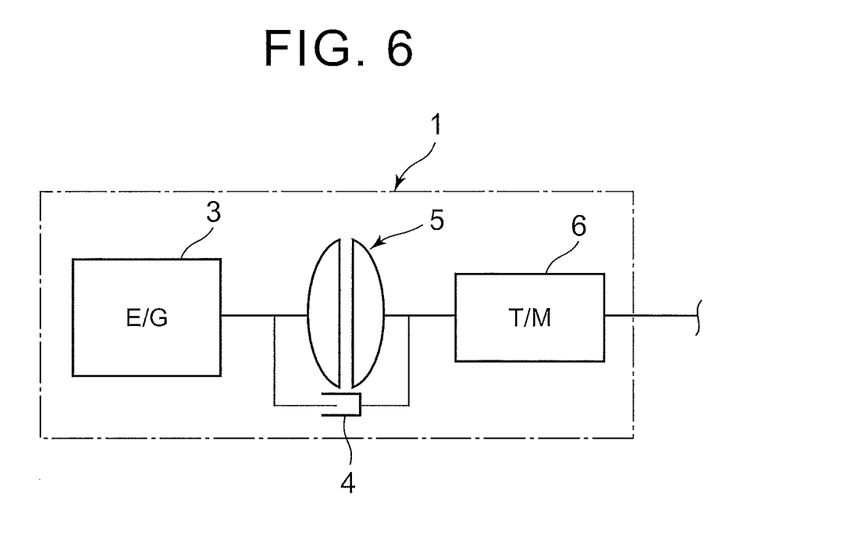
FIG. 6 is a schematic diagram illustrating an example of a power plant.

A driving force control device according to the present invention will be described in more detail below. First, a vehicle to which the present invention can be applied will be described. FIG. 5 schematically illustrates a drive system and a control system of a vehicle to which the present invention can be applied, where a power plant 1 that outputs at least dynamic power for running is connected to driving wheels 2 such as rear wheels. The power plant 1 may have the same configuration as a power plant mounted on a general vehicle in the related art and includes an internal combustion engine (E/G, which is referred to as an engine) 3 such as a gasoline engine as a drive source, a torque converter 5 including a lockup clutch 4 connected to the output shaft thereof, and a transmission (T/M) 6 connected to the output side of the torque converter 5 as illustrated in FIG. 6. The transmission 6 may be any one of a stepped automatic transmission and a stepless automatic transmission. Accordingly, when the engine 3 is activated, a driving force of an accelerating force corresponding to the torque or the transmission gear ratio in the transmission 6. Since dynamic power loss such as a frictional force or pumping loss for compressing and exhausting mixed air occurs in the engine 3, the dynamic loss can be made to act as a decelerating force (braking force).

Figure 7:
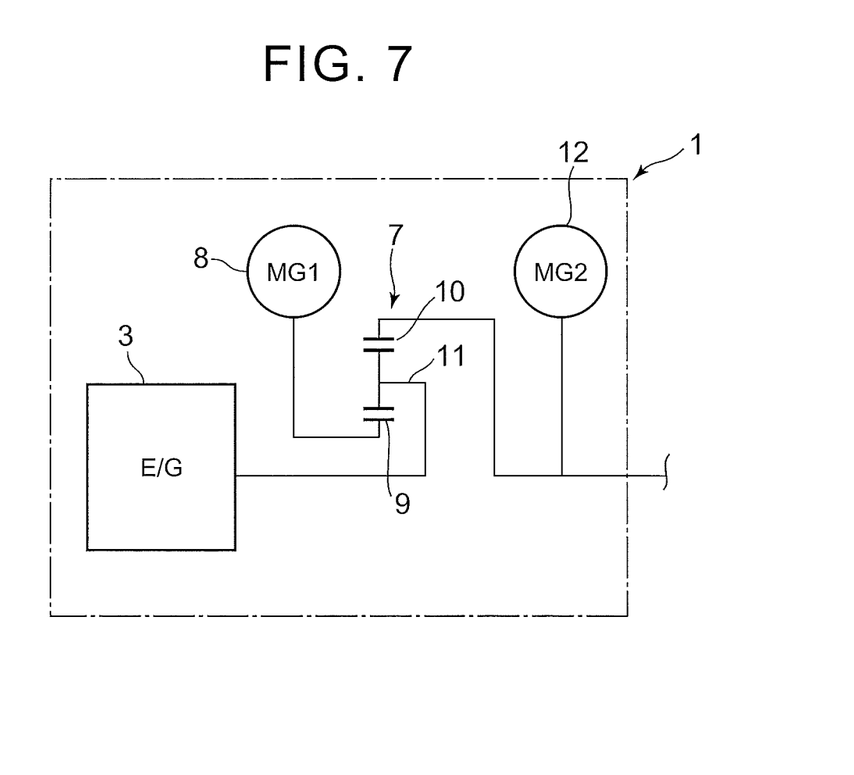
FIG. 7 is a schematic diagram illustrating another example of the power plant.

The power plant 1 may be a hybrid driving device using an internal engine and an electric motor as drive sources. FIG. 7 schematically illustrates an example of a so-called two-motor type hybrid driving device, where the engine 3 and a first motor-generator set (MG1) 8 are connected to a power distribution mechanism 7 including a single-pinion planetary gear mechanism. That is, the power distribution mechanism 7 includes a sun gear 9, a ring gear 10 an internally-teethed gear disposed on the concentric circle with the sun gear 9, and a carrier 11 supporting a pinion gear, which is disposed between the sun gear 9 and the ring gear 10 and engages with the sun gear 9 and the ring gear 10, so as to rotate and revolve as rotation elements, and the rotation elements are configured to rotate differentially from each other. The engine 3 is connected to the carrier 11 and thus the carrier 11 serves as an input element. The first motor-generator set 8 is connected to the sun gear 9 and thus the sun gear 9 serves as a reaction element. Accordingly, the ring gear 10 serves as an output element and a second motor-generator set (MG2) 12 is connected to the ring gear 10. Therefore, in the hybrid driving device having the configuration illustrated in FIG. 7, the dynamic power output from the engine 3 is distributed to the sun gear 9 side and the ring gear 10 side by the power distribution mechanism 7, and the first motor-generator set 8 rotates with the torque transmitted from the sun gear 9 and serves as a power generator. That is, a part of the dynamic power output from the engine 3 is converted into electric power. In this case, by controlling the rotation speed of the first motor-generator set 8, the rotation speed of the engine 3 can be continuously changed and thus the rotation speed of the engine 3 can be set to a rotation speed at which the fuel efficiency is excellent. On the other hand, the first motor-generator set 8 is electrically connect to the second motor-generator set 12 via a battery (not illustrated) or without passing through the battery, and the second motor generator set 12 is activated with the electric power generated from the first motor-generator set 8 to combine the dynamic power temporarily distributed by the power distribution mechanism 7 and to output the combined dynamic power to the driving wheels 2. At the time of deceleration or the like, the second motor-generator set 12 can serve as a power generator to generate a braking force and the first motor-generator set 8 can be activated with the electric power to appropriately control the rotation speed of the engine.

In the example illustrated in FIG. 5, the rear wheels 2 are driving wheels and front wheels 13 are turning wheels which are turned by a steering device 14. The rear wheels 2 and the front wheels 13 are provided with braking mechanisms 15, respectively, and the braking mechanisms 15 are activated to generate braking forces corresponding to the degree of operation by causing a driver to operate a brake operating mechanism such as a brake pedal 16. Although not illustrated in FIG. 5, an accelerator pedal for performing an accelerating/decelerating operation, an accelerator opening sensor, a sensor for detecting a vehicle speed, a sensor for detecting a steering angle, an acceleration sensor for detecting a lateral acceleration Gy or a longitudinal acceleration Gx, a sensor for detecting a yaw rate, and the like are provided.

An electronic control unit (ECU) 17 for controlling a driving force or a braking force of the power plant 1 and a braking force of the braking mechanism 15 is provided. The electronic control unit 17 is constituted mainly by a computer (microprocessor) and a memory and is configured to perform a computing operation using input data, stored data, and predetermined programs and to output a predetermined command signal to the power plant 1, the braking mechanisms 15, and the like. As examples of the data input to the electronic control unit 17, a degree of operation $\theta_B$ of a brake such as a stepping force or a stepping angle on a brake pedal 16, a degree of accelerator opening Acc, a steering angle δ, a vehicle speed V, a longitudinal acceleration Gx, a lateral acceleration Gy, a yaw rate γ, and the like are input from various sensors to the electronic control unit 17. The electronic control unit 17 may be configured to collectively control the power plant 1 and the braking mechanisms 15 or may be configured to comprehensively control a microcomputer for the power plant 1 or a microcomputer for the braking mechanisms 15.

Figure 1:
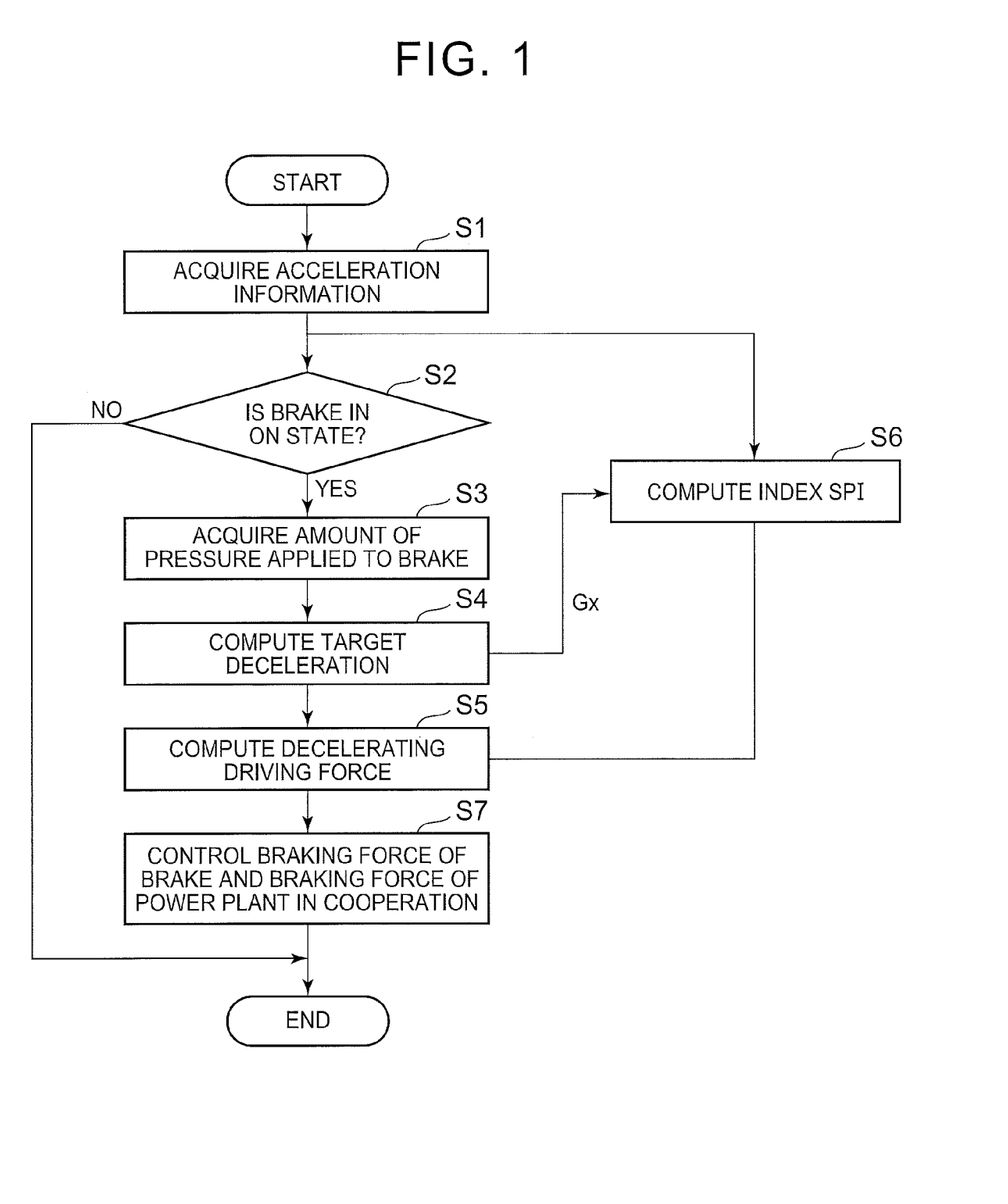
FIG. 1 is a flowchart illustrating a control example that is performed by a driving force control device according to the present invention.

The driving force control device according to the present invention is configured to control a driving force at the time of braking or a driving force at the time of the next acceleration from the time of braking, and is specifically configured to perform a control routine illustrated in FIG. 1. The routine illustrated in the flowchart of FIG. 1 is repeatedly performed in a state where the vehicle runs or in a state where a main switch of the vehicle is turned on, and acceleration information is first acquired (step S1). The acceleration information is information including at least a lateral acceleration Gy and specifically including the lateral acceleration Gy and the longitudinal acceleration Gx detected by a sensor or including estimated values of the lateral acceleration Gy and the longitudinal acceleration Gx computed from the vehicle speed, the degree of accelerator opening Acc, the steering angle δ, and the like.

Subsequently, it is determined whether the brake is in the ON state (step S2). This determination can be performed on the basis of a signal from a brake switch that is turned by stepping on the brake pedal 16, and when the brake is not operated and thus the determination result of step S2 is negative, the routine illustrated in FIG. 1 temporarily ends without performing any particular control. On the contrary, when the brake is operated and thus the determination result of step S2 is positive, an amount of pressure applied to the brake is acquired (step S3). The amount of pressure applied to the brake indicates the braking or decelerating intention of a driver and the stepping force, the stepping angle, or the like on the brake pedal 16 can be detected using a sensor.

A target deceleration (or required braking force) is computed on the basis of the amount of pressure applied to the brake (step S4). The relationship between the amount of pressure applied to the brake and the target deceleration can be appropriately determined in design, can be prepared as a map in which the relationship is determined depending on the weight of the vehicle body, the vehicle type, and the vehicle speed by experiment, simulation, or the like. Accordingly, the computation of step S4 is performed on the basis of the acquired amount of pressure applied to the brake, the vehicle speed at that time, other data stored in advance, and the map prepared in advance.

A decelerating driving force is computed on the basis of the acceleration information acquired in step S1 (step S5). The decelerating driving force is a decelerating force or a braking force generated from the power plant 1, and is a negative driving force which is called engine braking force in the vehicle having the engine 3 mounted thereon. When the decelerating driving force is mainly generated by the pumping loss of the engine 3, the engine 3 is activated with the supply of a fuel at a rotation speed lower than or equal to a fuel-cut return rotation speed and thus the engine braking force is generated at a rotation speed (or vehicle speed) higher than or equal to a predetermined low rotation speed. The decelerating driving force is a negative torque based on energy regeneration of an electric motor or a motor-generator set in case of a hybrid vehicle or an electric automobile.

In general, a relatively large decelerating driving force is required in a state of low vehicle speed to a state of high vehicle speed. This is because the vehicle speed in an urban area is generally low or middle and the frequency of acceleration and deceleration is high in the urban area. Accordingly, the decelerating driving force can be prepared as a map in advance and the computation of step S5 can be performed using the map. An example of the map is illustrated in FIG. 2.

Figure 2:
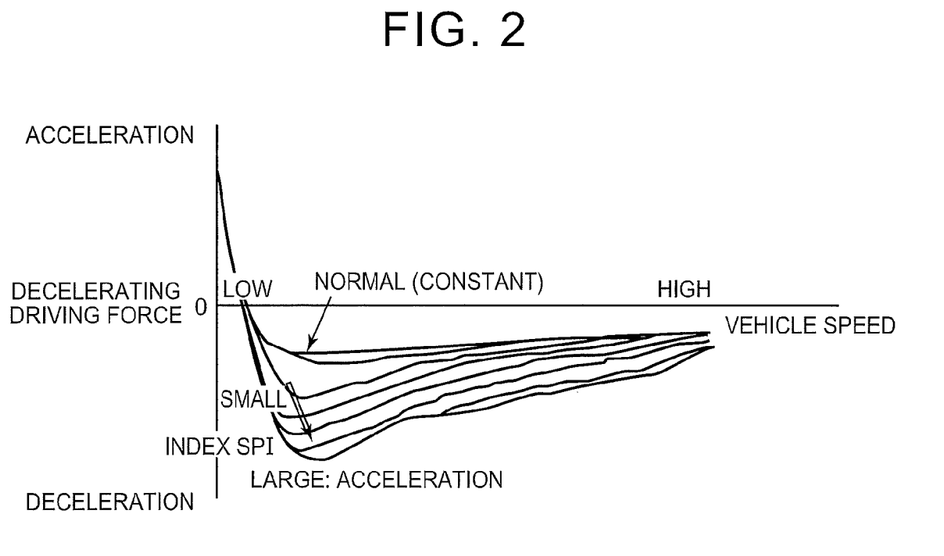
FIG. 2 is a diagram illustrating an example of a map in which a decelerating driving force is defined in correlation with a vehicle speed and an acceleration.
Figure 3:
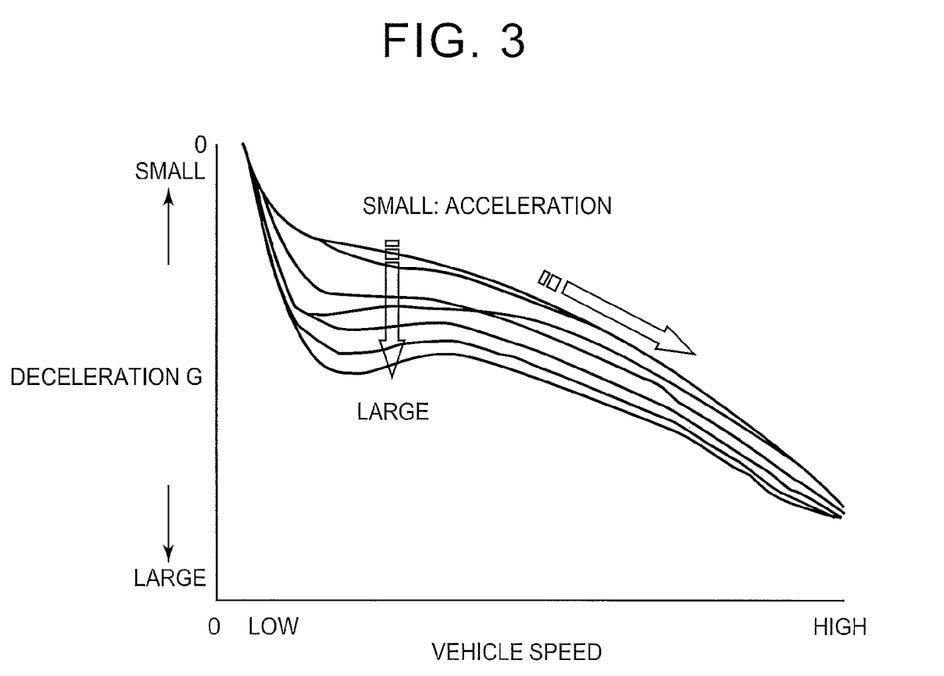
FIG. 3 is a diagram illustrating a map in which the decelerating driving force is replaced with a deceleration.

In FIG. 2, "large" and "small" represent the magnitude of the acceleration including the lateral acceleration Gy, and the larger the acceleration acquired in step S1 becomes, the larger the decelerating driving force becomes (the larger the negative driving force becomes). A map in which the decelerating driving force in FIG. 2 is replaced with a speed-reducing acceleration (deceleration G) is illustrated in FIG. 3. As illustrated in FIG. 3, even when the speed-reducing acceleration is relatively small, the speed-reducing acceleration becomes larger at a high vehicle speed and thus the vehicle speed is rapidly lowered.

As described above, since the acceleration or deceleration of the vehicle is generated by causing the driver to perform an accelerating and decelerating operation or steering the steering wheel, the longitudinal acceleration Gx or the lateral acceleration Gy reflect the driving operation and thus the driving intention can be understood from the accelerations Gx, Gy. The index SPI described in PCT International Publication No. 2011/021634 is an index indicating a degree of sport-driving inclination calculated from the combined acceleration $(=\sqrt{(Gx^2+Gy^2)})$ and includes the lateral acceleration Gy. Accordingly, the combined acceleration or the index SPI can be reflected in the decelerating driving force. For example, as illustrated in FIG. 1, the combined acceleration is calculated using the longitudinal acceleration Gx and the lateral acceleration Gy included in the acceleration information in step S1, and the index SPI is calculated from the combined acceleration (or an instantaneous SPI described in PCT International Publication No. 2011/021634) in the way described in PCT International Publication No. 2011/021634 (step S6). Since the index SPI calculated in this way corresponds to the acceleration denoted by curves in FIG. 2 or 3, any curve illustrated in FIG. 2 is selected on the basis of the index SPI and the decelerating driving force is calculated using the selected curve as a map. Accordingly, it is possible to acquire the decelerating driving force in more consideration of the driving inclination or the driving intention of the driver.

In the example illustrated in FIG. 2 or 3, the variation ratio of the decelerating driving force or the speed-reducing acceleration to the increase of the acceleration or the index SPI gradually decreases. That is, the relationship between the acceleration or the index SPI and the decelerating driving force or the speed-reducing acceleration has nonlinear characteristics. This tendency is marked at a low vehicle speed. In other words, as the driving inclination has a stronger request for prompt behavior of the vehicle, the rate of increase of the braking force of the power plant 1 gradually decreases. Even when the operation such as the accelerating or decelerating operation or the steering operation is slow, the behavior of the vehicle can be satisfactorily changed without requesting the driver for a large operation and it is possible to provide a vehicle that can be conveniently driven.

After the target deceleration is calculated on the basis of the operation of the brake and the decelerating driving force is calculated on the basis of the acceleration information, the cooperative control of the braking force of the braking mechanisms 15 and the decelerating driving force (the braking force of the power plant 1) is performed so as to achieve the target deceleration (step S7). That is, the deceleration as the combination of the braking forces is controlled to reach the target deceleration. Accordingly, when any one braking force decreases, the other braking force is set to increase. In this case, the ratio of the braking forces can be appropriately set. For example, when the dynamic power regenerated by the power plant 1 increases, the braking force of the power plant 1 increases and thus the so-called frictional braking force of the braking mechanisms 15 is set to relatively decrease. On the contrary, when the charging of a rechargeable battery is limited and thus the amount of energy regenerated by the power plant 1 is limited, the braking force of the power plant 1 decreases and thus the braking force of the braking mechanisms 15 is set to increase.

When the index SPI is computed in step S6, the target deceleration computed in step S4 instead of the longitudinal acceleration Gx acquired in step S1 can be employed as the longitudinal acceleration Gx. Accordingly, the target deceleration used for the cooperative control of step S7 and the deceleration driving force to be controlled in the cooperative control can be synchronized with each other. That is, no deviation occurs in the computation of the values thereof or data used for the computation and thus controllability is improved.

Another control example that is performed by the driving force control device according to the present invention will be described below with reference to FIG. 4. The example described herein is an example where a step of controlling an engine rotation speed so as to correspond to a driving inclination when the sport driving is requested added. The driving inclination can be calculated as the index SPI described in PCT International Publication No. 2011/021634 and thus instantaneous SPI $(=\sqrt{(Gx^2+Gy^2)})$ which is the combined acceleration of the longitudinal acceleration Gx and the lateral acceleration Gy is first computed (step S11). Subsequently, the index SPI is computed on the basis of the instantaneous SPI (step S12). The method of calculating the index SPI may employ the method described in PCT International Publication No. 2011/021634. It is also determined whether the degree of accelerator opening is greater than that in the accelerator OFF state (step S13). This determination can be performed on the basis of a signal output from the accelerator opening sensor. When the determination result of step S13 is negative, it means that the accelerator pedal is restored and the degree of opening is less than or equal to the degree of opening in the accelerator OFF state. Accordingly, the vehicle is in a decelerating state and thus the deceleration driving force is computed in this case (step S14). The control of step S14 is the same control as step S5 illustrated in FIG. 1.

In a vehicle including a power generator such as a motor-generator set or an alternator, the kinetic energy of the vehicle is regenerated at the time of deceleration, but the amount of energy regenerated may be limited depending on the state of charge of a power storage device or the like. Accordingly, the optimal amount of energy regenerated is computed subsequently to step S14 (step S15). This computation can be performed by calculating the electric power that can be regenerated to charge the power storage device at that time on the basis of the state of charge of the power storage device.

It is determined whether the engine rotation sped Ne is greater than a predetermined rotation speed ON (step S16). In brief, step S16 is performed to determine whether the engine 3 rotates, and thus the predetermined rotation speed ON is a low rotation speed close to "0". When the determination result of step S16 is negative, it means that it is determined in step S13 that the accelerator is in the OFF state, and thus the vehicle is in a so-called electric-vehicle (EV) running state in which the vehicle runs with the electric motor or the motor-generator set. That is, since the engine 3 stops, the routine illustrated in FIG. 4 temporarily ends without performing any particular control in this case. On the contrary, when the determination result of step S16 is positive, the vehicle is in a so-called hybrid (HV) running state in which the vehicle runs with the engine 3 and the motor-generator set and the engine 3 is activated. Accordingly, a target value of a lower limit engine rotation speed (Ne) in a normal mode is computed (step S17). The normal mode is a control mode in which the engine rotation speed, the transmission gear ratio, or the like is controlled with priority given to the fuel efficiency and is set in advance depending on the vehicle type. Accordingly, in the normal mode, since the transmission gear ratio or the engine rotation speed corresponding to the vehicle speed is set in advance so as to improve the fuel efficiency, the lower limit target value of the engine rotation speed is calculated on the basis of the vehicle speed or the substantial transmission gear ratio at that time.

On the other hand, when the accelerator is in the OFF state and thus the determination result of step S13 is negative, it is determined whether a power switch is turned on (step S18). The power switch is a switch that is operated by a driver so as to switch the control mode or the running mode to a power mode in which the driving force increases. When the power switch is turned off and thus the determination result of step S18 is negative, it is determined whether the index SPI is greater than a predetermined threshold value a (step S19). As described above, the index SPI is calculated on the basis of the acceleration and has a large value when the acceleration (positive and negative acceleration) of the vehicle is large or when the acceleration estimated from the degree of operation such as the degree of accelerator opening or the steering angle is large. Accordingly, when the index SPI is greater than the threshold value α, it is determined that the driver performs prompt driving in which a large acceleration is generated and intends so-called sporty driving. That is, it is determined that the driving inclination is the sport-driving inclination, and the target value of the lower limit engine rotation speed (Ne) is computed on the basis of the value of the index SPI in this case (step S20).

When the driving inclination is sporty, that is, when the index SPI has a large value, it is necessary to generate a driving force or a braking force suitable for the driving inclination and thus the control characteristics such as the engine rotation speed or the degree of throttle opening are set to characteristics for so-called high power. Accordingly, the engine rotation speed is also controlled to increase and the lower limit rotation speed is also set to a high rotation speed. In step S20, the target value of the lower limit rotation speed determined in advance in this way is acquired from the map or the like. When the determination result of step S19 is negative, the routine illustrated in FIG. 4 temporarily ends without performing any particular control. When the accelerator pedal is stepped on and thus the determination result of step S13 is positive, the target value of the lower limit engine rotation speed is immediately calculated on the basis of the index SPI in step S20. The target value of the higher rotation speed is selected out of the target value of the lower limit engine rotation speed computed in step S17 and the target value of the lower limit engine rotation speed computed in step S20 (step S21). The so-called max select adjustment is carried out. The target engine rotation speed is computed on the basis of the target value of the selected lower limit engine rotation speed (step S22).

Figure 4:
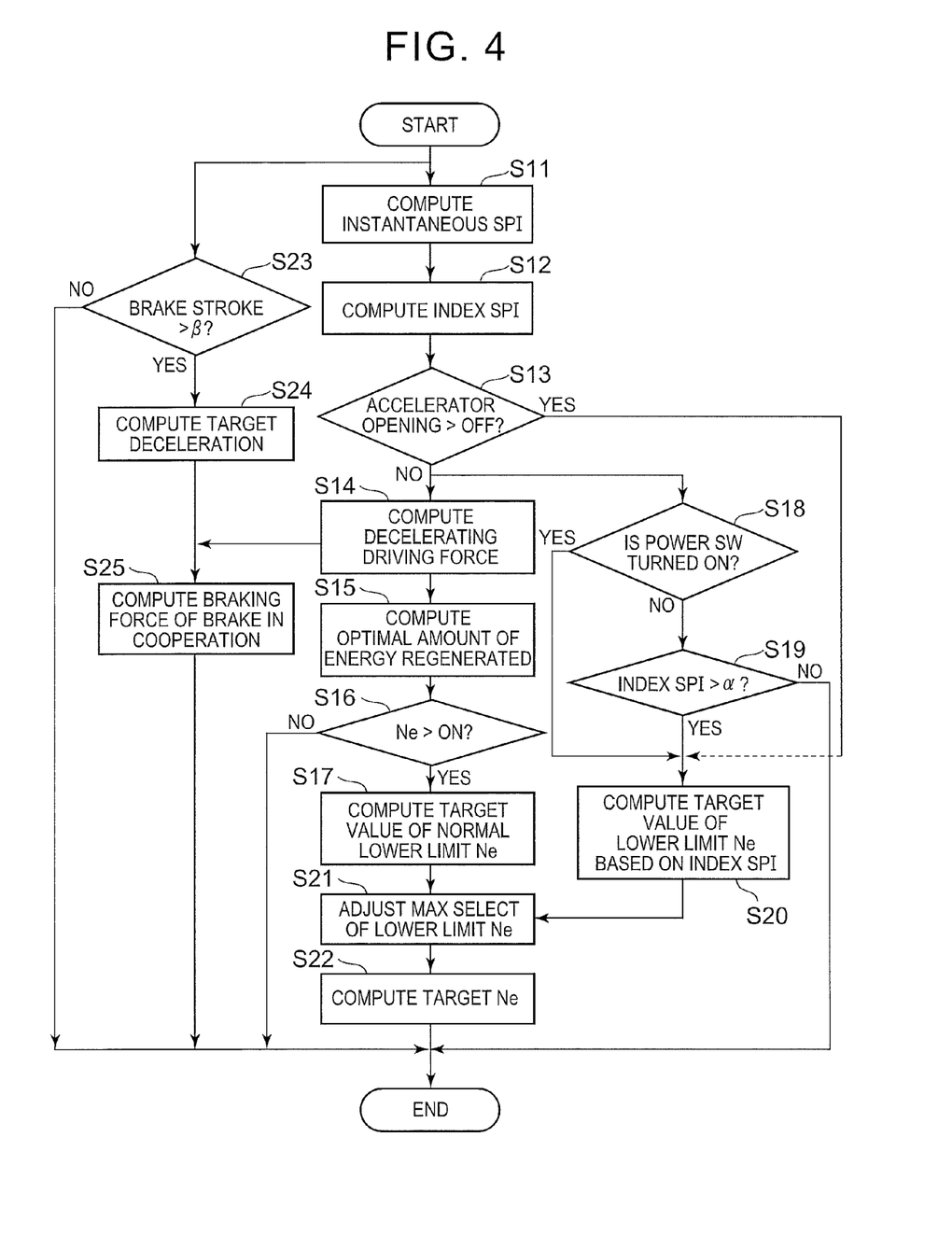
FIG. 4 is a flowchart illustrating another control example that is performed by the control device according to the present invention.

That is, in the control example illustrated in FIG. 4, the engine rotation speed at the time of deceleration increases in preparation of acceleration that is predicted to occur after the deceleration. In other words, the control of increasing the engine rotation speed when the braking force at the time of deceleration in the accelerator OFF state is generated by the power plant 1 including the engine 3 toward the rotation speed at which the acceleration responsiveness is excellent so as to rapidly generate the driving force for acceleration at the time of the next acceleration is performed. Such a rotation speed control is performed by controlling the transmission gear ratio when the stepped transmission is provided, and can be performed by controlling the engine rotation speed through the use of the first motor-generator set 8 while generating the braking force through the use of the second motor-generator set 12 in case of the above-mentioned two-motor type hybrid vehicle. Accordingly, by performing the control routine illustrated in FIG. 4, the braking operation at the time of running in a corner is simplified and thus the driver can concentrate consciousness on the steering. Accordingly, it is possible to improve driving convenience and to improve acceleration responsiveness at the time of departing from a corner.

In the control example illustrated in FIG. 4, the same control as the control illustrated in FIG. 1 is performed in parallel. That is, it is determined whether a brake stroke is greater than a predetermined threshold value β (step S23). The brake stroke is an amount of pressure applied to the brake pedal 16 and the threshold value β is a value corresponding to looseness of the brake pedal 16. That is, step S23 is a step for determining whether the brake is substantially operated. Accordingly, when the determination result of step S23 is negative, the routine illustrated in FIG. 4 temporarily ends without performing any particular control. On the contrary, when the brake is operated and the determination result of step S23 is positive, the target deceleration is computed on the basis of the amount of pressure applied to the brake (step S24), similarly to step S4 illustrated in FIG. 1. The decelerating driving force computed in step S14 is taken and the cooperative control of the braking force of the brake and the braking force of the power plant is performed in the same way as in step S7 of FIG. 1 (step S25).

The driving force control device according to the present invention is configured to control the deceleration driving force (or the braking force) mainly on the basis of the control command signal from the electronic control unit 17 and thus the present invention can be described as functional means as follows. That is, the driving force control device of a vehicle according to the present invention is configured to calculate a required braking force on the basis of an amount of pressure applied to a brake operating mechanism, which is operated for deceleration by a driver, and to control a braking force of a power plant, which includes a drive source generating an accelerating force and a braking force, and a braking force of a braking mechanism; which generates a braking force with the operation of the braking operating mechanism, in cooperation so that the total braking force of the vehicle as a whole becomes the required braking force, the driving force control device of a vehicle includes acceleration information detecting means for detecting acceleration information including a lateral acceleration of the vehicle and power plant braking force control means for controlling the braking force of the power plant on the basis of the detected acceleration information when the brake operating mechanism is operated.

The driving force control device according to the present invention may further include driving inclination determining means for determining the driving inclination on the basis of the acceleration information.

The driving force control device according to the present invention may further include rotation speed adjusting means for increasing a rotation speed of the drive source to a rotation speed at which acceleration responsiveness is excellent in a decelerating state after the driver's operation on the brake operating mechanism is released in preparation of acceleration after the deceleration ends.

The invention claimed is:

1. A driving force control device of a vehicle, the driving force control device comprising:
   an electronic control unit having control logic configured to cause the electronic control unit to:
   calculate a required braking force on the basis of an amount of pressure applied to a brake operating mechanism, which is operated for deceleration by a driver;
   control (i) a braking force of a power plant, which includes a drive source generating an accelerating force and the braking force, and (ii) a braking force of a brake operating mechanism, the brake operating mechanism generating the braking force in cooperation with the braking force of the power plant as a total braking force of the vehicle, which becomes the required braking force of the vehicle;
   detect acceleration information including a lateral acceleration of the vehicle;
   control the braking force of the power plant on the basis of the detected acceleration information when the brake operating mechanism is operated; and
   increase a rotation speed of the drive source after the driver's operation on the brake operating mechanism is released but while the vehicle is still in a decelerating state, in preparation for a predicted desired acceleration by the driver once the decelerating state has ended but before the driver performs an accelerating operation.

2. The driving force control device according to claim 1, wherein
   the drive source of the power plant includes an electric motor; and
   the braking force of the power plant is generated by controlling a regenerative torque of the electric motor on the basis of the acceleration information.

3. The driving force control device according to claim 1, wherein an invention of the driver is determined on the basis of the acceleration information.

4. The driving force control device according to claim 1, wherein the rotation speed at which the drive source generates a braking force in the decelerating state after the driver's operation on the brake operating mechanism is released is a first rotation speed or a second rotation speed, the second rotation speed being obtained by adjusting the first rotation speed based on the acceleration information previously detected by the driving force control device.

5. The driving force control device according to claim 1, wherein the acceleration information includes an acceleration that is generated by the required braking force.

6. The driving force control device according to claim 3, wherein a rate of increase of the braking force of the power plant gradually decreases as the vehicle speed increases.

* * * * *